US011875335B2

(12) United States Patent
Benkreira et al.

(10) Patent No.: US 11,875,335 B2
(45) Date of Patent: Jan. 16, 2024

(54) DETERMINING MERCHANT ENFORCED TRANSACTION RULES

(71) Applicant: Capital One Services, LLC, McLean, VA (US)

(72) Inventors: Abdelkader Benkreira, Brooklyn, NY (US); Taurean Butler, Brooklyn, NY (US); Adam Vukich, Springfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/398,360

(22) Filed: Aug. 10, 2021

(65) Prior Publication Data

US 2023/0053091 A1 Feb. 16, 2023

(51) Int. Cl.
*G06Q 40/00* (2023.01)
*G06Q 20/34* (2012.01)
*G06N 20/00* (2019.01)

(52) U.S. Cl.
CPC ............. *G06Q 20/34* (2013.01); *G06N 20/00* (2019.01)

(58) Field of Classification Search
CPC ............................... G06Q 20/34; G06N 20/00
USPC .......................................................... 705/39
See application file for complete search history.

(56) References Cited

U.S. PATENT DOCUMENTS

| 9,058,607 | B2 | 6/2015 | Ganti et al. | |
| 10,825,028 | B1 | 11/2020 | Kramme et al. | |
| 10,949,852 | B1 | 3/2021 | Kramme et al. | |
| 11,037,159 | B1 | 6/2021 | Kramme et al. | |
| 2016/0086222 | A1* | 3/2016 | Kurapati | G06Q 40/08 705/14.53 |
| 2019/0073669 | A1* | 3/2019 | Dutta | G06Q 20/40 |
| 2023/0035570 | A1* | 2/2023 | Edwards | G06Q 20/40 |

* cited by examiner

*Primary Examiner* — Olabode Akintola
(74) *Attorney, Agent, or Firm* — Banner & Witcoff, Ltd.

(57) ABSTRACT

Systems as described herein determine merchant enforced transaction rules. A determination server may receive transaction data associated with a plurality of merchants. The determination server may generate a histogram of payments associated with a merchant category and filter out transaction data having purchase amounts above or below a predetermined threshold. The determination server may determine a first average purchase amount associated with merchants in the merchant category and a second average purchase amount associated with each merchant in the merchant category. The determination server may determine user spending patterns and that a first merchant in the merchant category enforces one or more card-based transaction rules using machine learning models. After determining that a user device is proximately located to the first merchant, a notification indicating the one or more card-based transaction rules associated with the first merchant may be sent to the user device.

19 Claims, 10 Drawing Sheets

DETERMINING MERCHANT ENFORCED TRANSACTION RULES

FIELD OF USE

Aspects of the disclosure relate generally to big data and more specifically to the processing and management of big data.

BACKGROUND

In an electronic payment processing network, a financial institution may receive transaction data originated from a variety of merchants, including small business merchants. The merchants may enforce certain card-based transaction rules, such as a requirement of a minimum purchase amount, or a maximum purchase amount for debit card or credit card-based transactions. The customers may not be aware of these rules until they are ready to make the payment. As a result, the customers may have to, for example, either pay a surcharge or to make additional purchase to meet the minimum purchase amount requirement. Conventional financial systems may not have a mechanism to readily identify these rules antecedently, thereby limiting their ability to provide insights to the transactions and facilitate their customers to make informed decisions.

Aspects described herein may address these and other problems, and generally improve the quality, efficiency, and speed of processing big data to offer insights into merchants that enforce card-based transaction rules so that a notification may be sent to the customers when they come into the vicinity of such merchants.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for determining merchant enforced transaction rules. A determination system may receive transaction data associated with a plurality of merchants and users. A histogram of payments associated with a merchant category may be generated based on the transaction data. The determination system may filter out transaction data that have purchase amounts above or below a predetermined threshold. The determination system may determine a first average purchase amount associated with merchants in the merchant category, and a second average purchase amount associated with each merchant in the merchant category. The determination system may determine spending patterns associated with the plurality of users using a first machine learning model. Based on the spending patterns and the second average purchase amount, the determination system may determine that a first merchant in the merchant category enforces one or more card-based transaction rules determining using a second machine learning model. Responsive to a determination that a user device associated with a first user is proximately located to the first merchant, a notification may be sent to the user device indicating the one or more card-based transaction rules associated with the first merchant.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for determining merchant enforced transaction rules. The card-based transaction rules may include a minimum purchase amount, a maximum purchase amount, a surcharge for card-based transactions, and/or a restriction on acceptance of certain credit cards or debit cards. The determination system may detect a pattern associated with a plurality of transactions that each share a common payment amount or a payment amount above a predetermined amount (i.e., there are no payments below a certain amount). The determination system may determine that the first merchant in the merchant category enforces the one or more card-based transaction rules based on the common payment amount or the payment amount above a predetermined amount.

The determination system as described herein allows for receiving, a geographic location associated with the user device, and comparing the geographic location with a predefined geofence associated with the first merchant. The determination system may also detect that the user device has connected to a wireless network associated with the first merchant for a predetermined period of time.

In many aspects, the determination system may train the first machine learning model using transaction data associated with one or more merchants in the merchant category. The determination system may train the second machine learning model using transaction data associated with merchants of similar size of the first merchant and/or located in a geographic area of the first merchant. The determination may receive a geographic location associated with the user device, and send a second notification to the user device indicating a plurality of merchants in the area of the geographic location that do not enforce the one or more card-based transaction rules.

Rule Determination Systems

Figure 1:
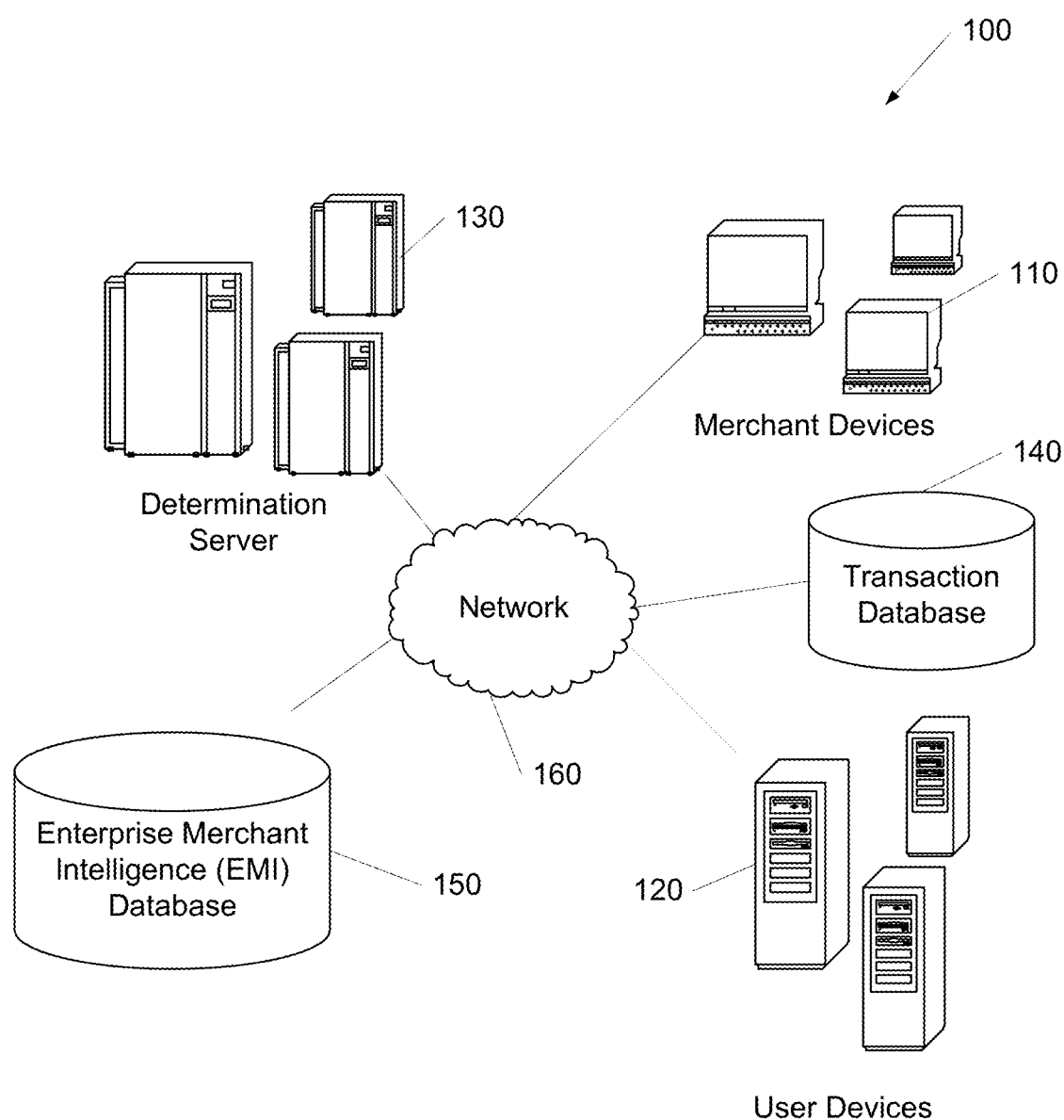
FIG. 1 shows an example of a system for determining merchant enforced transaction rules in which one or more aspects described herein may be implemented.

FIG. 1 shows an example of a system 100 where the card-based rules may be determined. The system 100 may include one or more merchant devices 110, one or more user devices 120, at least one determination server 130, at least one transaction record database 140, and/or at least one enterprise merchant intelligence (EMI) database 150 via a network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Merchant devices 110 may submit transaction information related to a transaction such as a merchant identifier, a transaction amount, a merchant identifier, a transaction location, and/or a transaction timestamp. Merchant devices 110 may send requests for authorization for transactions for payments that may be subject to card-based transaction rules. Some merchant devices 110 may be a Point of Sale (POS) device located at a small business merchant, such as a convenience store, a coffee shop, a gas station, a farmer's market, etc. These small business merchants may enforce some card-based transaction rules including, for example, a requirement for a minimum purchase amount, a surcharge for credit card-based transactions, or an acceptance of certain credit cards (e.g. Visa Card), but not other credit cards (e.g. American Express). Some merchant devices 110 may be located at a merchant such as a car dealership or a university that may process transactions related to car payment or tuition payment. These merchant (e.g. car dealership, university) may enforce rules such as a maximum amount allowable for credit card-based transactions, or an acceptance of only certain credit cards.

User devices 120 may be any device that belongs to a customer of a financial institution. The customers may conduct transactions with merchant devices 110 using user devices 120 and/or the card issued by the financial institution. For example, a customer may make an online tuition payment using user devices 120. User devices 120 may send a geographic location to determination server 130 so that the determination server 130 may be aware that user devices 110 may be proximately located to, or within a geo-fence associated with, a merchant. User devices may connect to a wireless network associated with a merchant when the user devise 110 may be within the vicinity of a merchant. User devices 110 may receive a notification whether one or more merchant may enforce card-based transaction rules. For example, user devices 110 may display a map showing a current location of the user devices 110 and several merchants that may be proximately located to the user devices 110. User devices 110 may receive a notification indicating the merchants that may enforce card-based transaction rules and may display such merchants on the map with corresponding labels.

User devices 110 may include computing devices, such as laptop computers, desktop computers, mobile devices, smart phones, tablets, and the like. According to some examples, user devices 110 may include hardware and software that allow them to connect directly to network 160. Alternatively, user devices 110 may connect to a local device, such as a personal computer, server, or other computing device, which connects to network 160.

Determination server 130 may receive transaction data from merchant devices 110 from a plurality of merchants. Determination server 130 may retrieve merchant category information from a merchant database, such as enterprise merchant intelligence (EMI) database 150. The merchant category information may include a merchant category code (MCC) to classify a merchant by the types of goods and/or services it provides. Determination server 130 may generate a histogram of payments associated with a merchant category based on the transaction data. For example, determination server 130 may identify a merchant category of interest, such as a merchant category of convenience stores, or car dealers. Determination server 130 may generate a histogram of payments for the bands or ranges of payments for the merchants in the merchant category of convenience stores. To determine whether the convenience stores enforce a minimum or maximum purchase amount, determination server 130 may filter out any payment information that is, for example, above $10 and analyze the payment data in the lower end of the histogram for purchases made in convenience stores. Determination server 130 may filter out any payment information that is, for example, below $5000 and analyze the payment data in the higher end of the histogram for purchases made in car dealers. Determination server 130 may determine a first average purchase amount associated with merchants in the merchant category. The first average purchase amount may be a minimum or a maximum charge amount that the merchants in the merchant category may impose for card-based transactions. Based on the first average purchase amount, determination server 130 may determine a second average purchase amount associated with each merchant in the merchant category. The second average purchase amount may be a minimum or a maximum charge amount that a particular merchant may impose for card-based transactions.

Determination server 130 may determining spending patterns associated with the plurality of users using a first machine learning model. For example, determination server 130 may determine a pattern in a plurality of transactions, that each share a common payment amount. Based on the spending patterns and based on the second average purchase amount, determination server 130 may determine that a first merchant in the merchant category enforces one or more card-based transaction rules using a second machine learning model.

Determination server 130 may receive geographic location information from user devices 120 and determine that a user device, may be proximately located to, or within a geo-fence of, the first merchant. Determination server 130 may send to the user device a notification indicating the one or more card-based transaction rules associated with the first merchant. Determination server 130 may also send to the user device a notification indicating other merchants who do not enforce card-based transaction rules.

Transaction database 140 may store transaction records related to transactions previously conducted by users in transaction streams from a plurality of merchants. Transaction database 140 may receive a request from determination server 130 and retrieve the corresponding transaction records to generate the histogram of payments. The transaction records may each contain an account identifier, a transaction amount, a transaction time, a merchant identifier, etc. Transaction database 140 may store transaction records from merchants that may enforce one or more card-based transaction rules, such as a minimum purchase amount, a maximum purchase amount, or a surcharge for using a credit card or debit card.

Enterprise merchant intelligence (EMI) database 150 may store merchant records related to various merchants, including small business merchants. EMI database 150 may be a merchant database that stores enterprise merchant intelligence records, which may in turn include a merchant identifier, a friendly merchant name, a zip code, a physical address, a phone number, an email or other contact information of the merchants, and/or a merchant category code (MCC). A MCC may be a four-digit number listed in ISO 18245 for retail financial services and used to classify a business by the types of goods and/or services it provides. MCCs may be assigned either by merchant type (e.g., one for hotels, one for office supply stores, etc.) or by merchant name. For example, convenience stores are classified as MCC No. 5499, "MISC Food Stores—Default," car dealers are classified as MCC No. 5511, "Car & Truck Dealers/New/Used," and universities are classified as MCC No. 8229, "Colleges/UNIV/JC/Profession." The merchant records may be collected from public resources and/or merchant reported records.

In a variety of embodiments, a financial organization may build a proprietary EMI database 150, for example, based on an aggregation of transaction records in transaction database 150. As a transaction arrives from a transaction stream, the corresponding transaction record may be processed, cleaned, and/or enhanced with a variety of services. For example, when a financial institution receives the transaction information in a transaction stream, the transaction information may be in the form of a line of data that offers limited information about the transaction, with each piece of information appearing in certain locations within the line of data. The merchant identifier may appear in a specific location and may include 8-10 characters in the abbreviated form, which may not be readily recognizable as a meaningful merchant name, particularly for small business merchants. The financial institution may process this abbreviated merchant identifier and convert it into a meaningful merchant name in a human readable format, and store it in EMI database 150.

In a variety of embodiments, a financial institution may use a third party API to gather merchant information, such as a merchant address or contact information, to be stored in EMI database 150. In a variety of embodiments, a financial organization may maintain more static merchant information, such as a merchant identifier and MCC, in its proprietary EMI database 150; and a financial institution may use the third-party API to get merchant address, merchant social media handle, or other merchant information that may change over time. Determination server 130 may store in EMI database 150, one or more card-based transaction rules associated with certain merchants.

Merchant devices 110, user devices 120, determination server 130, transaction database 140, and/or EMI database 150 may be associated with a particular authentication session. Determination 130 may receive, process, and/or store a variety of transaction records, enterprise merchant intelligence information and card-based transaction rules, and/or receive transaction records with merchant devices 110 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 160 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Computing Devices

Figure 2:
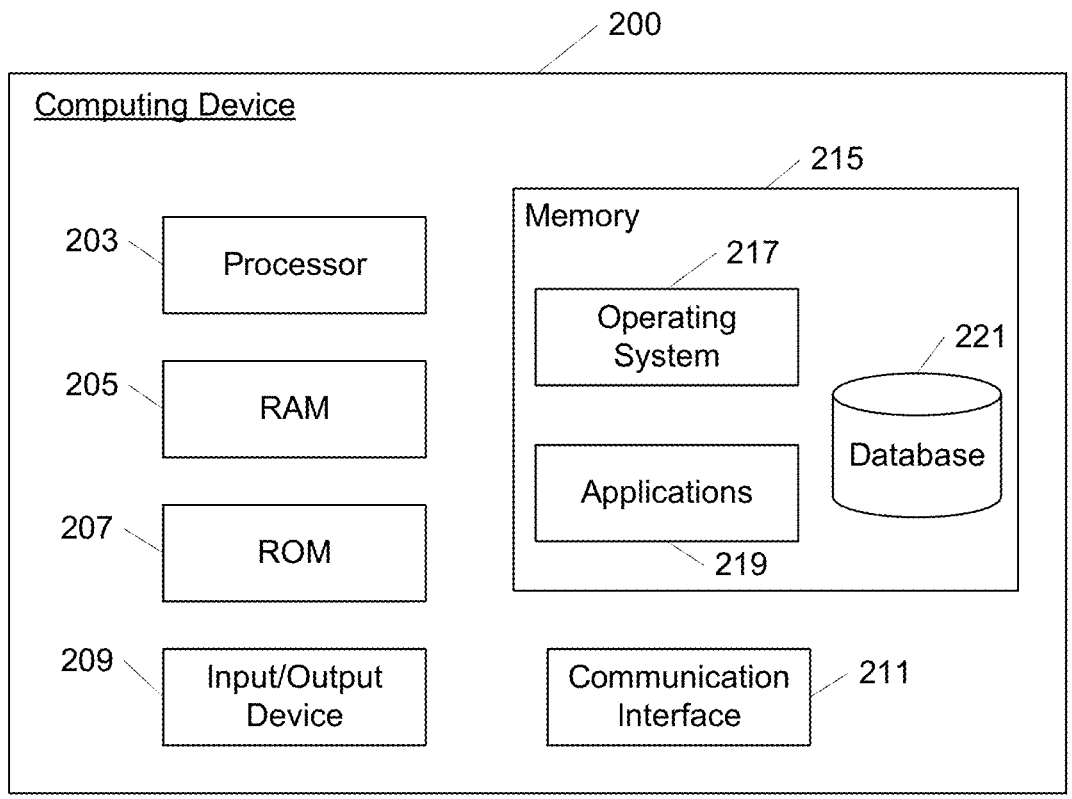
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Determining Merchant Enforced Transaction Rules

The determination system may process transaction data related to tens of thousands of merchants, including small business merchants to generate a histogram of payments. The determination system may analyze the histogram of payments and further determine user spending patterns using machine learning models. The determination system may determine whether a merchant enforces one or more card-based transaction rules. The determination system may send a notification to a user device that the merchant may enforce card-based transaction rules, or provide options for other merchants who do not enforce such transactions rules, upon a determination that the user device is proximately located to the merchant.

Figure 3:
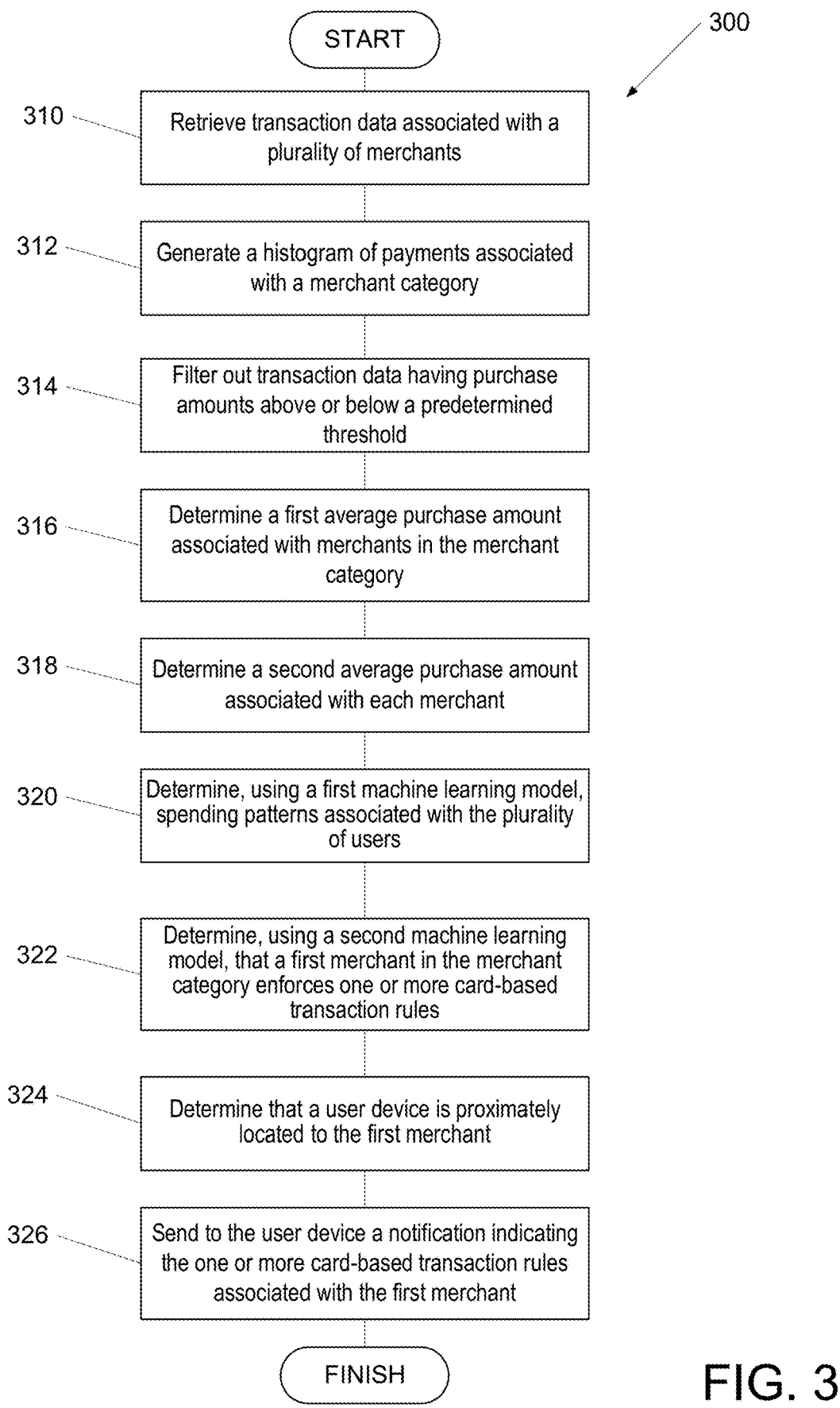
FIG. 3 shows a flow chart of a process for determining merchant enforced transaction rules according to one or more aspects of the disclosure.

FIG. 3 shows a flow chart of a process for determining merchant enforced transaction rules according to one or more aspects of the disclosure. Some or all of the steps of process 300 may be performed using one or more computing devices as described herein.

At step 310, the determination server may receive transaction data associated with a plurality of merchants. The transaction data may be generated from a plurality of users and/or received via an electronic payment network. Many merchants may have a general agreement with financial institutions that the merchants may not charge an extra fee for the customers to use a credit or debit card or impose a minimum purchase amount for using the cards. However, some merchants may still enforce such card-based transaction rules, particularly some small business merchants, such as a convenience store, a coffee shop, a gas station, a farmer's market, etc. For example, in a farmer's market, the merchant may have a stall selling vegetables, and the profit margin may be relatively low. So the merchant may not wish to accept credit card for purchases under $5. Some other merchants such as a car dealer, a jewelry store, or a university may impose a maximum purchase amount on transactions using a credit card. For example, in a used car dealer, a customer may purchase a used car for $11,000. The dealer may allow the customer to charge, at a maximum, $3000 on the credit card and the remaining balance to be provided with a personal check. In another example, a college student may use a credit card to pay a portion of her tuition and the university may impose a rule for a maximum amount of $5000 to be charged on the credit card. The university may have further restrictions, that only a Visa or Master Card may be accepted, but not a Discover Card, an American Express Card or any international card. As such, merchant enforced card-based transaction rules may not be readily visible to the financial institutions, and their customers may not be well-informed or offered alternative options to deal with such rules ahead of time.

In a variety of embodiments, the transaction data may be retrieved from a transaction database maintained by a financial institution. The transaction data may include a transaction identifier, a transaction amount, a merchant identifier, a transaction location, and/or a transaction timestamp. In some examples, the transaction data may be received from a customer when a receipt of the transaction was uploaded to the financial institution. The financial institution may ask the customer to provide a confirmation whether the merchant enforces any card-based transaction rules.

In a variety of embodiments, the determination server may retrieve transaction data related to merchants in a certain merchant category. The determination server may retrieve transaction record containing a merchant identifier from the transaction database. The determination server may also retrieve the MCC related to the merchant identifier from an EMI database. As discussed previously, the MCC may identify a merchant by the types of goods and/or services it provides. For example, the convenience stores may be classified as MCC No. 5499, the car dealers may be classified as MCC No. 5511 and the universities may be classified as MCC No. 8229.

At step 312, a histogram of payments for a merchant category may be generated based on the transaction data. For example, the determination server may generate a histogram of payments for the merchant category related to convenience stores, or another histogram of payments may be related to a merchant category of jewelry stores. The determination server may use all available transaction data related to a merchant category to generate the histogram of payments. Alternatively, the determination server may generate the histogram using a random sampling, where a subset of individuals or a sample may be chosen from all transaction data related to the merchant category. In random sampling, each individual may be chosen randomly and entirely by chance, such that each individual has the same probability of being chosen at any stage during the sampling process, and each subset of k individuals has the same probability of being chosen for the sample as any other subset of k individuals.

Figure 4A:
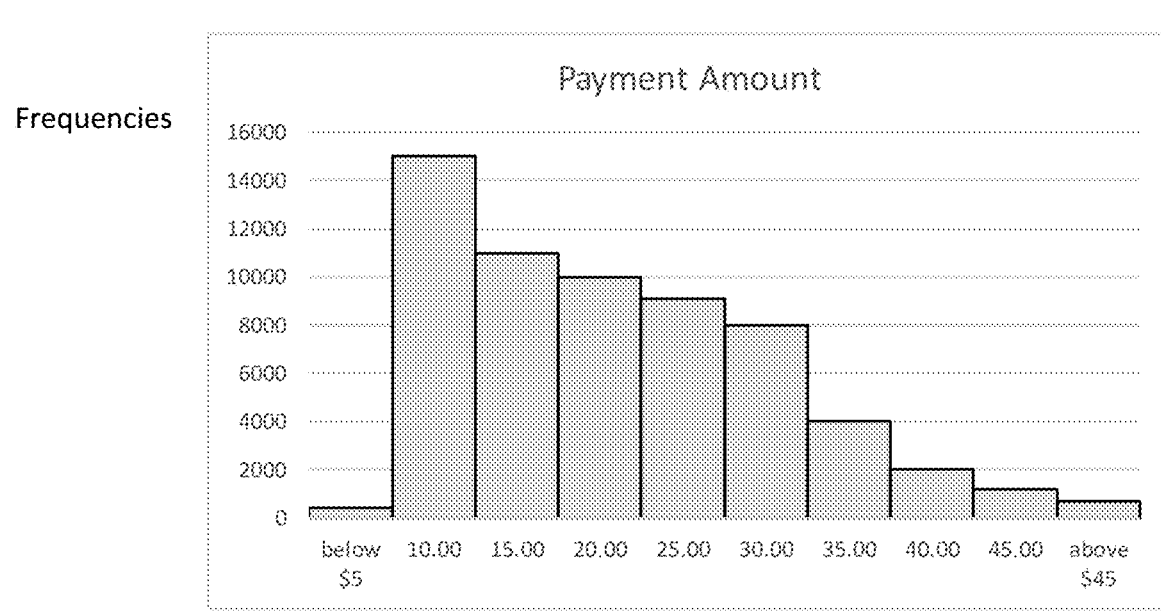
FIGS. 4A-4B show example histograms of payments for determining merchant enforced transaction rules according to one or more aspects of the disclosure.
Figure 4B:
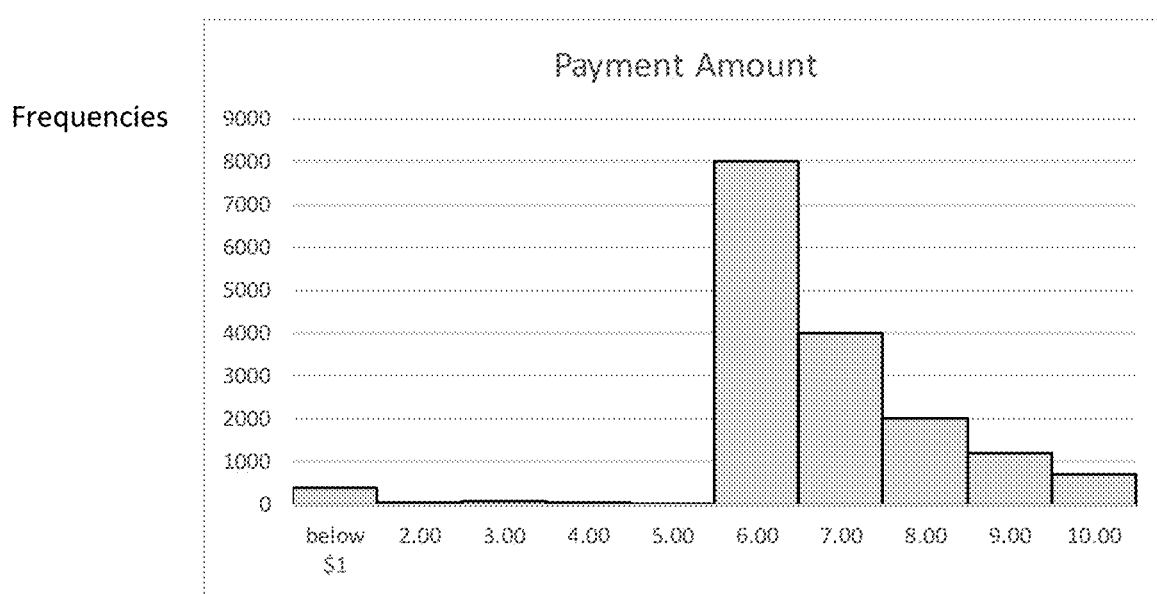

FIGS. 4A-4B show example histograms of payments for determining merchant enforced transaction rules according to one or more aspects of the disclosure. The histogram of payments in FIG. 4A may be generated using random sampling with, for example, approximately 60,000 transactions. The example histogram of payments illustrated in FIG. 4A may be related to transactions in convenience stores. The determination server may take these 60,000 transactions and split into ten bands of payments—for payments under $5, between $5-10, $10-15, $15-20, $20-25, $25-30, $30-35, $35-40, $40-45 and above $45, respectively. The distribution of payments may be shown in each band of payments. As illustrated in FIG. 4A, there are a large number of transactions having payments between $5-10, while there is a small number of transactions having payments under $5.

At step 314, transaction data having purchase amounts above or below a predetermined threshold may be filtered out. The determination server may analyze the histogram of payments and focus on the lower or higher end of the bands of payment. For example, for the histogram of payments related to convenience stores in FIG. 4A, the determination server may attempt to determine whether the convenience stores may enforce a minimum purchase amount transaction rule. The determination server may filter out payment amounts above $10 and focus the analysis on bands of payments that are below $10, as illustrated in FIG. 4B. FIG. 4B shows a histogram displaying ten bands of payments— for payments under $1, $1-2, $2-3, $3-4, $4-5, $5-6, $6-7, $7-8, $8-9 and $9-10, respectively. There are a large number of transactions having payments above $5, particularly in the band of payments between $5-6. In comparison, there is small or minimal number of transactions in the lower five bands: under $1, $1-2, $2-3, $3-4 and $4-5. There may be slightly more under $1 transactions than transactions in the other four bands between $1-5. These under $1 transactions may be the anomalies when a few cents are charged to a card to check the transactions in some merchants in the merchant category. Based on the contrast between the fifth and sixth bands, there may be an indication that $5 may be the minimum purchase amount. In an example to determine a maximum purchase amount, such as for transactions originated from a jewelry store or a car dealer, the determination may filter out transactions below a certain payment amount, and focus the analysis on a high end of the bands of payments.

At step 316, a first average purchase amount associated with merchants in the merchant category may be determined. The first average purchase amount may reflect a minimum purchase amount or a maximum purchase amount associated with the merchants in the merchant category. For example, based on the bands of payments on the lower end of the histogram of payments, the determination server may determine the minimum purchase amount for the convenience stores. As illustrated in FIGS. 4A-4B, the determination server may observe, for example, there are a large number of transactions all share the common purchase amount of $5, while there is small or minimal number of transactions with a purchase amount that is under $5. This observation may be an indication to the determination server that many convenience stores in this merchant category may enforce a minimum purchase amount of $5.

At step 318, the determination server may determine a second average purchase amount associated with each merchant in the merchant category based on the first average purchase amount. For example, after the determination server determines that many convenience stores enforce the transaction rule of $5 minimum purchase amount, the determination server may use this amount as a benchmark to analyze transaction data for each merchant in the convenience store merchant category. For transaction data related to a particular merchant, the determination server may compare the transaction data with the $5 benchmark directly. The determination server may also generate a histogram of payment similar to that of FIGS. 4A-4B. If the determination server may observe that there is small or minimum number of purchase amount that is below $5, this may be an indication that this particular merchant may enforce the transaction rule of the $5 minimum purchase amount for card-based transactions. If the determination server may observe that there are a large amount of purchase amount that is below $5, this may be an indication that this particular merchant may not enforce the transaction rule that requires a minimum purchase amount for card-based transaction.

In a variety of embodiments, the determination server may store in the EMI database the information whether a merchant enforces a card-based transaction rule. The determination server may retrieve the stored information and present to user devices subsequently. For merchants that may not have corresponding information on the card-based transaction rules stored in the EMI database, the determination server may make the determinations on the transaction rules based on user spending patterns.

At step 320, the determination server may determine spending patterns associated with a plurality of users using a first machine learning model. The determination server may use transaction data associated with merchants in a merchant category as training data for the first machine learning model. The first machine learning may determine spending patterns associated with the users based on the transaction data. The spending patterns may include the transaction amount, the transaction timestamp, the merchant identifier, and/or the transaction location related to transactions originated from a user in a merchant category. For example, a user may purchase products from a variety of convenience stores in her neighborhood. She may purchase a pack of gum from convenience store A for $1.09, a magazine from convenience store B for $3.99, and a cup of coffee and some other items for $5.09 from convenience store C. The first machine learning may observe the user's spending pattern that she never spends less than $5 in store C. The first machine learning model may also look at spending patterns for other users for purchases made from store C. If the machine learning model determines that the transactions originated from store C rarely have a transaction amount below $5, the transaction data may indicate that it is likely that store C may enforce a $5 minimum purchase amount card-based transaction rule. The determination server may submit the transaction data related to store C to a second machine learning model in step 322 for further processing.

At step 322, the determination server may determine that a first merchant (such as store C) in the merchant category enforces one or more card-based transaction rules using a second machine learning model. The determination server may determine the transaction rules related to store C, for example, based on the spending patterns and the second average purchase amount. For example, the second machine learning model may be trained using transaction data associated with merchants of similar size to store C and/or located in a same geographic area as store C. The determination server may determine, in step 318, a plurality of convenience stores that enforce the $5 minimum purchase amount card-based transaction rules. The second machine learning model may be trained using the transaction data originating from stores that enforce the transaction rules. The transaction data may be filtered to generate a subset of data from stores that are of a similar size to store C and/or located in the similar geographical area and/or socioeconomic area as store C. The second machine learning model may take the subset of data, the spending patterns of the users and the second average purchase amount (e.g. $5 minimum purchase amount) as inputs and determine whether store C may enforce the $5 minimum purchase amount card-based transaction rules. For example, the second machine learning may determine that store C may enforce one or more card-based transaction rules.

The machine learning models may be beneficial when the determination server needs to determine the transaction rules for a new merchant or a merchant with limited transaction data. The determination server may extrapolate from transaction data for merchants in the same merchant category that may have similar merchant size and geographic location with those of the merchant to be analyzed.

At step 324, the determination server may determine that a user device is proximately located to the first merchant (e.g. store C). In a variety of embodiments, the determination server may receive a geographic location from a user device. The determination server may compare the geographic location with a predefined geofence associated with the first merchant (e.g. store C) and determine that the user device has come into the vicinity of store C or may be inside store C.

In a variety of embodiments, the determination server may detect that the user device has connected to a wireless network associated with the first merchant (e.g. store C) for a predetermined period of time. For example, after detecting that the user device has connected to a wireless network of store C for ten seconds, the determination server may take this as an indication that the user device is located within store C.

Figure 6A:
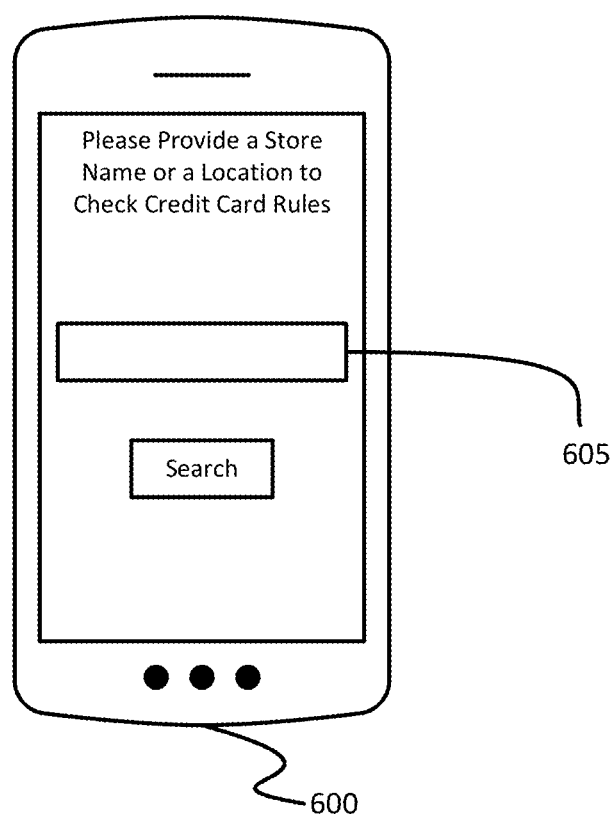
FIGS. 6A-6B show example search pages for determining merchant enforced transaction rules according to one or more aspects of the disclosure.
Figure 6B:
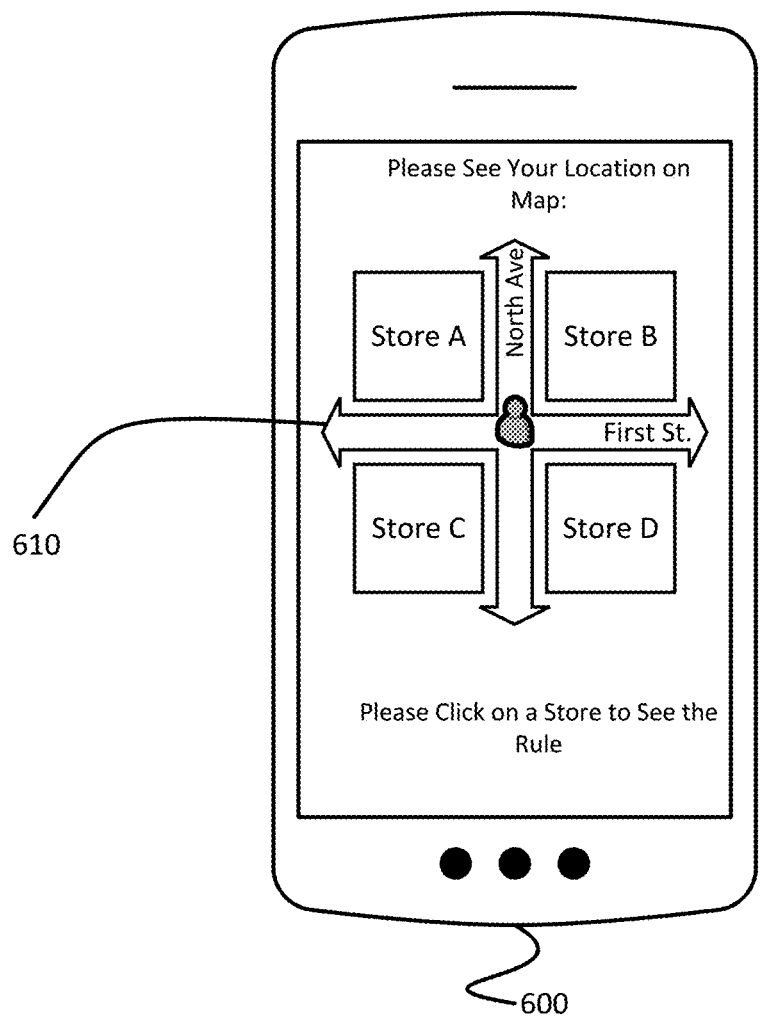

At step 326, a notification may be sent to the user device indicating the one or more card-based transaction rules associated with the first merchant (e.g. store C). The determination server may provide a user interface indicating the transaction rules after detecting that the user device is proximately located to store C or inside store C. The determination server may provide a search page on the user device and the user may search for the transaction rules associated with store C and/or stores nearby. For example, FIG. 6A illustrates an example search page that may be presented to user device 600. The user may enter a search query to provide a name of the store or a location in field 605. The determination server may respond to the search query and present the rules on the search page. In the example of FIG. 6B, the determination server may display a map 610, such as Google map on the user device. The map may display a current location of a user or user device, for example, at the intersection of North Avenue and First Street. The map may also display four stores, store A, B, C and D in a geographic area of the user device. The user may be presented with an option to click on a store to see the card-based transaction rules that the store may impose. For example, the user may click on store C and the transaction rules may be displayed on the map with store C. The determination server may display other stores on that map that may be in the vicinity of store C, such as store A, B or C. At least some of these other stores may not enforce the same card-based transaction rules as store C. As such, the user may have an option to go to an alternative store that does not enforce these rules.

Figure 7A:
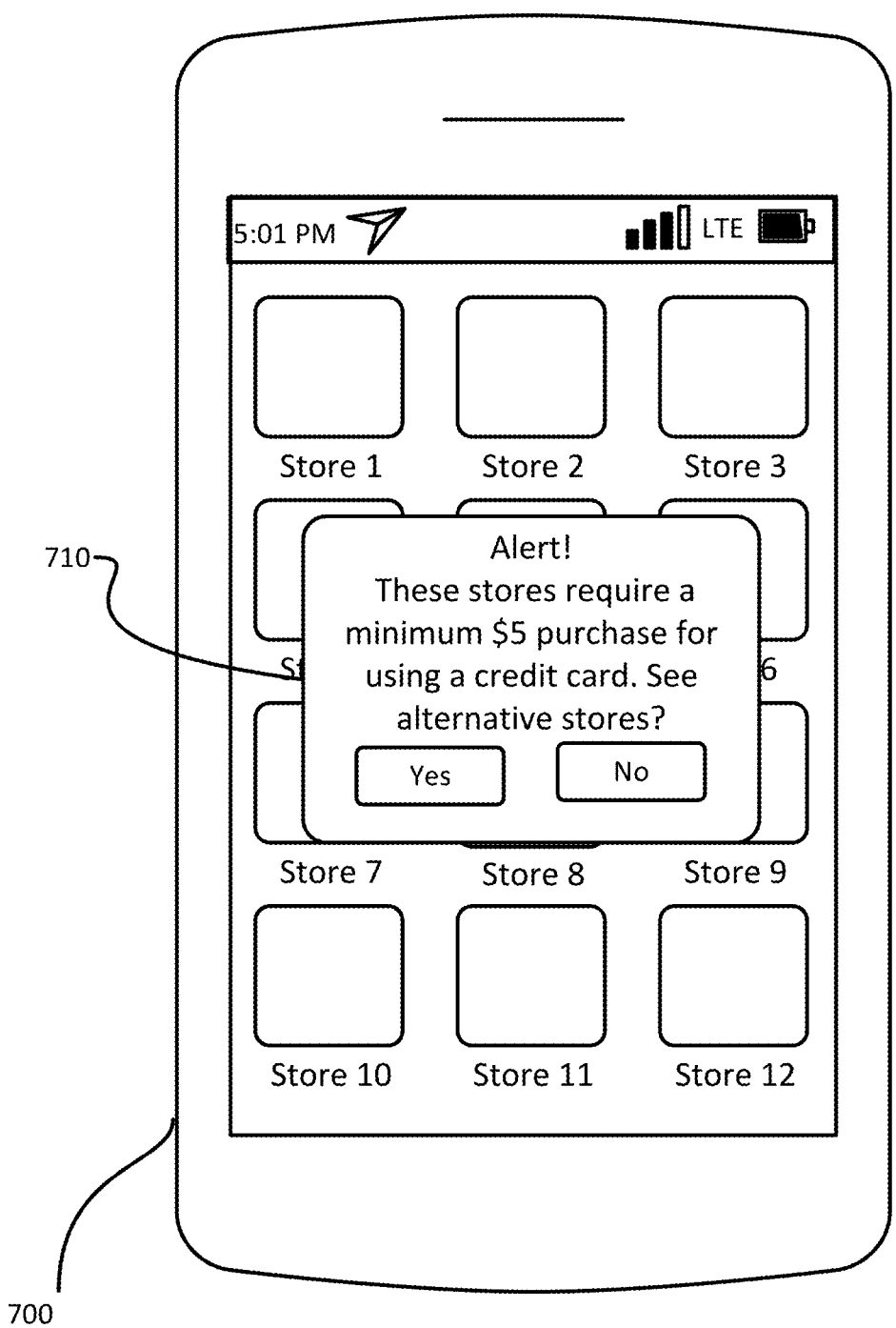
FIGS. 7A-7B show example notifications displayed on a user device according to one or more aspects of the disclosure.
Figure 7B:
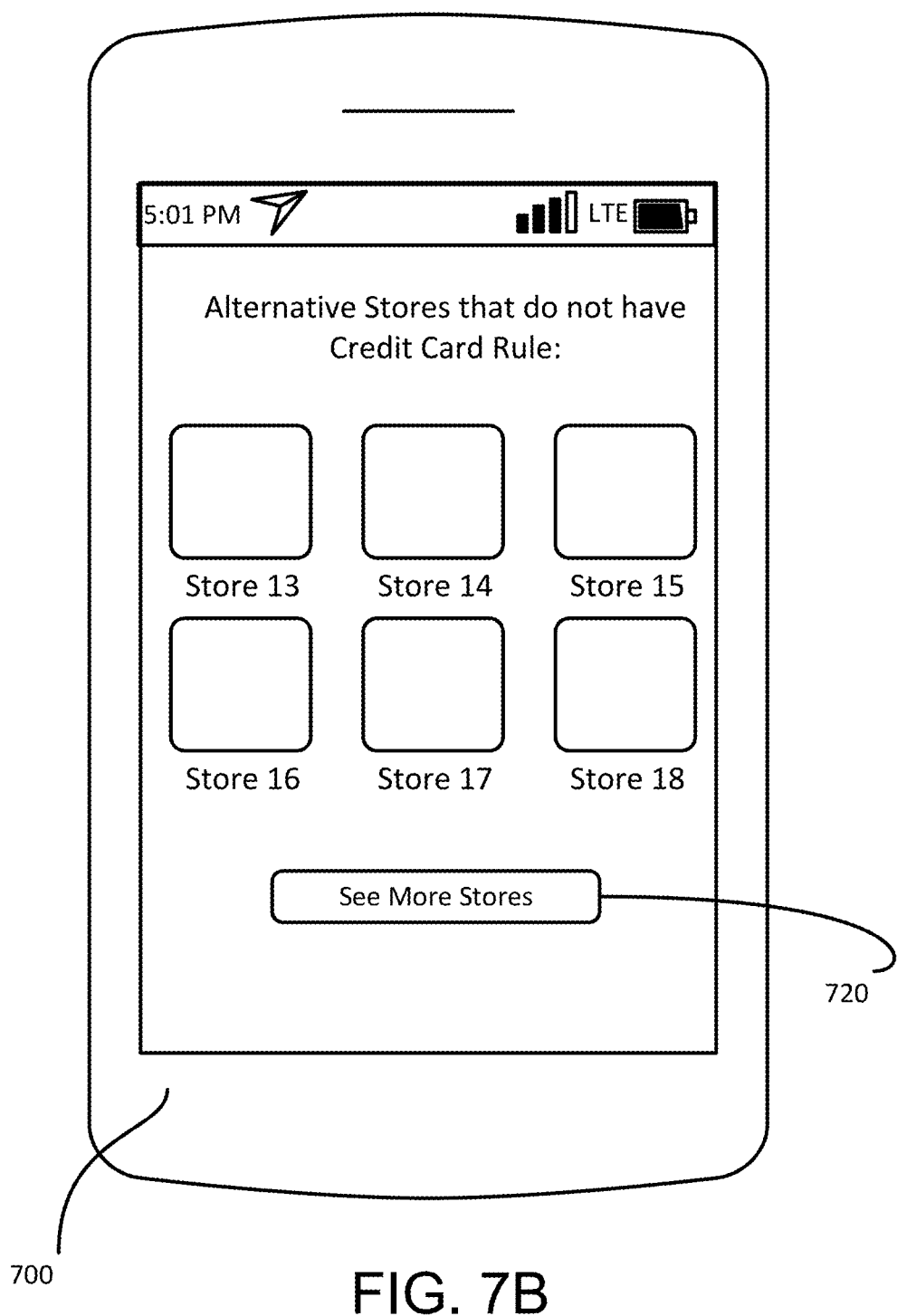

FIGS. 7A-7B show example notifications displayed on a user device according to one or more aspects of the disclosure. In FIG. 7A, a notification 710 may be sent to a user device listing a plurality of stores (e.g. Stores 1-12) in the geographic area of the user device. These stores may enforce one or more transaction rules, for example, a minimum purchase amount of $5. The notification 710 may provide an option to display alternative stores that do not enforce such rules. If the user selects the option to see the alterative stores that do not enforce the card-based transaction rules, stores 13-18 may be displayed in FIG. 7B. FIG. 7B may also provide an additional option 720 to view more stores in the geographic area that do not enforce the card-based transaction rules.

Figure 5:
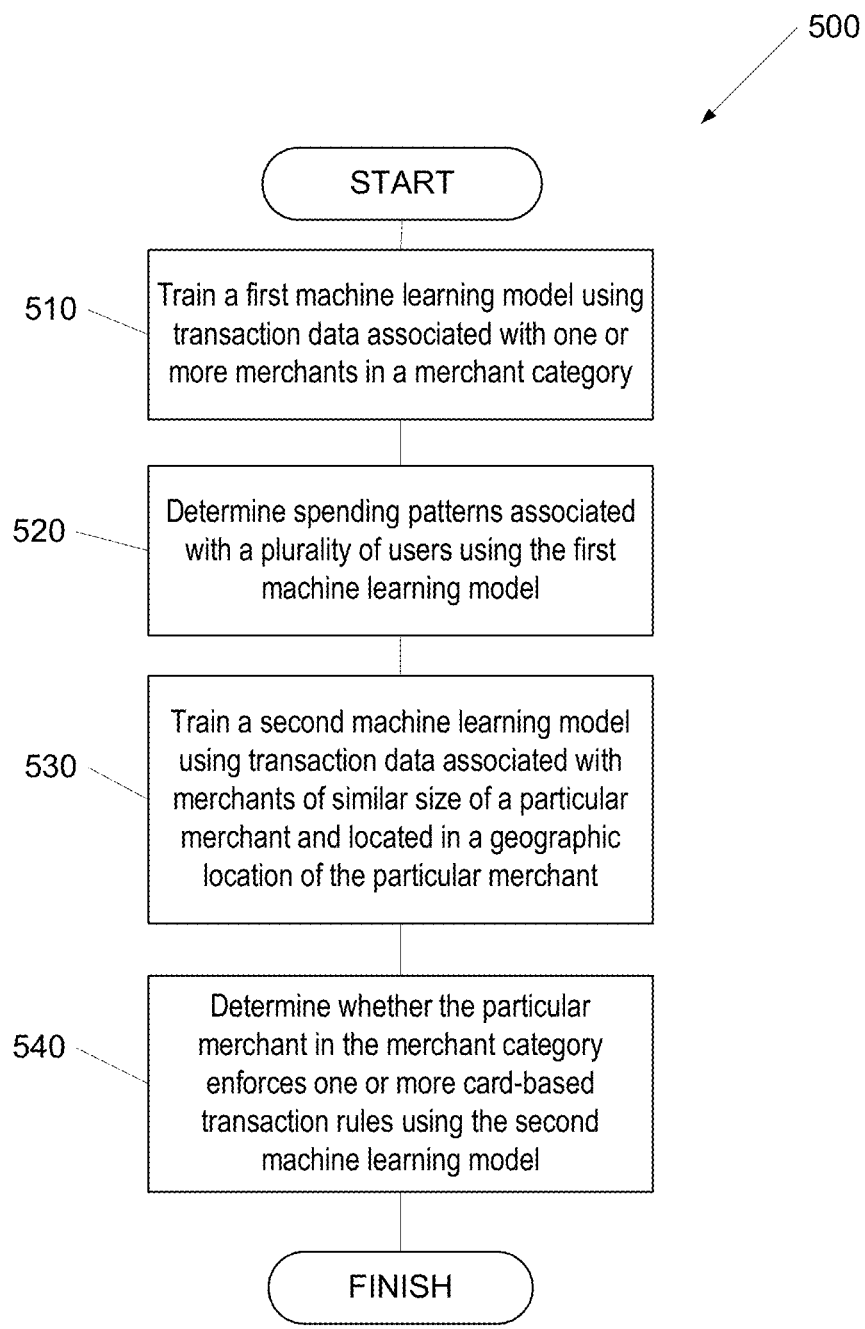
FIG. 5 shows a flow chart of a process for determining other merchant enforced transaction rules according to one or more aspects of the disclosure

FIG. 5 shows a flow chart of a process of for determining merchant enforced transaction rules according to one or more aspects of the disclosure. Some or all of the steps of process 500 may be performed using one or more computing devices as described herein.

At step 510, a first machine learning model may be trained using transaction data associated with one or more merchants in a merchant category. A determination server may attempt to determine whether a particular merchant (e.g. a car dealer) enforces one or more card-based transaction rules such as only certain credit cards (e.g. Visa Card or Master Card) may be accepted, but other cards (e.g. Discover Card, American Express or international card) may not be accepted. The determination server may retrieve from a transaction database and/or EMI database, transaction records related to merchant category code, for example, MCC No. 5511 for car dealers. The first machine learning model may be trained using relevant transaction data associated with MCC No. 5511.

At step 520, the first machine learning model may determine spending patterns from a plurality of users associated with the merchants in the merchant category. The spending patterns may include the credit/debit card type that the user used to make the purchase, the transaction timestamp, the merchant identifier, and/or the transaction location related to transactions originated from users in the merchant category. For example, a first user may purchase a used car from car dealer A using a Visa Card. A second user may purchase a car from car dealer A using a Master Card. A third user may purchase a car from car dealer B using a Discover Card. A fourth user may purchase a new car from dealer C using a Visa card. If the machine learning model determines that the transactions originated from dealer A has no, or minimal number, of transactions using a Discover Card, the transaction data may indicate that it is possible that dealer A may enforce a card-based transaction rule that does not allow Discover Card. The determination server may submit the transaction data related to dealer A to a second machine learning model for further processing.

At step 530, the second machine learning model may be trained using transaction data associated with merchants of similar (comparable) size to the particular merchant (e.g. dealer A) and/or located in a geographic area and/or socioeconomic area of the particular merchant. The determination server may determine the transaction rules related to dealer A, for example, based on the spending patterns. There may be limited transaction data related to dealer A, and the second machine learning model may extrapolate from transaction data originated from other car dealers of similar size to dealer A and/or located in the same (or similar) geographic area and/or socioeconomic area of dealer A.

At step 540, the second machine learning model may determine whether the particular merchant (e.g. dealer A) in the merchant category enforces one or more card-based transaction rules. The transaction data may be filtered to generate a subset of data from car dealers that have similar size of dealer A and/or are located in a similar geographic and/or socioeconomic area of dealer A. The second machine learning model may take the subset of data, the spending patterns of the users, and/or the card types as inputs and determine whether dealer A may enforce the card-based transaction rule that allow certain cards, while rejecting other cards. For example, the second machine learning may determine that dealer A may enforce a card-based transaction rule that only accept Visa Card or Master Card.

The techniques described herein may be used to determine merchant enforced card-based transaction rules. By using random sampling and generating a histogram of payments, the determination server may filter out irrelevant transaction data and focus the analysis on the bands of payments of interest. The determination server may use machine learning models to determine whether a merchant enforce transaction rules, particularly when there is limited transaction data originated from the merchant. The determination server may use geofence or wireless connectivity to determine a location of the user device and send a notification to the user device alerting such transaction rules and offer alternatives.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving, by a computing device, via an electronic payment network and from a plurality of users, transaction data associated with a plurality of merchants;
   generating a histogram of payments associated with a merchant category based on the transaction data;
   filtering out, based on an analysis of the histogram of payments, transaction data having purchase amounts above a predetermined threshold;
   determining, by the computing device and based on the filtered transaction data, a first average purchase amount associated with merchants in the merchant category;
   determining, by the computing device and based on the first average purchase amount in the filtered transaction, a second average purchase amount associated with each merchant in the merchant category;
   training, using first training data comprising a transaction amount and a transaction location associated with one or more merchants in the merchant category, a first machine learning model to determine transaction patterns of the one or more merchants in the merchant category;
   providing, as input to the first machine learning model, filtered transaction data associated with a first merchant from the plurality of users;
   receiving, as output from the first machine learning model, a spending pattern associated with the first merchant;
   providing, as input to a second machine learning model, the spending pattern associated with the first merchant and the second average purchase amount, wherein the second machine learning model is trained based on second training data comprising:
    prelabeled transaction data from training merchants having a similar size as the first merchant;
    prelabeled transaction data from training merchants located within a geographic location as the first merchant;
    prelabeled transaction data from training merchants in a same merchant category as the first merchant; and
    training labels indicating whether the training merchants enforce card enforce a card-based minimum purchase amount;
determining, based on output from the second machine learning model, that the first merchant in the merchant category enforces one or more card-based transaction rules comprising a minimum purchase amount on card-based transactions;
determining, by the computing device, that a user device, associated with a first user of the plurality of users, has connected to a wireless network associated with the first merchant for a predetermined period of time;
sending, by the computing device and to the user device associated with the first user, a notification indicating that the first merchant enforces the one or more card-based transaction rules comprising the minimum purchase amount on card-based transactions; and
causing, by the computing device, the user device to display the first merchant on a user interface with a flag indicating that the first merchant enforces the one or more card-based transaction rules comprising the minimum purchase amount on card-based transactions;
receiving, by the computing device and from the user interface on the user device, an indication for merchants that do not enforce the one or more card-based transaction rules comprising the minimum purchase amount on card-based transactions;
determining, based on the output of the second machine learning model, one or more merchants that do not enforce the one or more card-based transaction rules, wherein the second machine learning model is further trained based on prelabeled transaction data from training merchants that do not enforce the one or more card-based transaction rules; and
causing, by the computing device and on the user interface, the user device to display the one or more merchants that do not enforce the one or more card-based transaction rules.

2. The computer-implemented method of claim 1, wherein the spending pattern associated with the first merchant comprises a plurality of transactions that each share a common payment amount.

3. The computer-implemented method of claim 1, further comprising:
    storing, in a merchant database, the one or more card-based transaction rules associated with the first merchant.

4. The computer-implemented method of claim 1, wherein the one or more card-based transaction rules further comprises at least one of:
    a maximum purchase amount; or
    a surcharge for card-based transactions.

5. The computer-implemented method of claim 1, wherein determining that the user device has connected to the wireless network associated with the first merchant further comprises:
    receiving, from the user device, a geographic location associated with the user device; and
    comparing the geographic location with a predefined geofence associated with the first merchant.

6. The computer-implemented method of claim 1, wherein the first training data comprises different transaction amounts spent at different merchants by a particular user and different transaction amounts spent at a particular merchant by the plurality of users.

7. The computer-implemented method of claim 1, wherein the second training data comprises transaction data associated with merchants of similar size of the first merchant and located in a geographic location of the first merchant.

8. The computer-implemented method of claim 1, further comprising:
    receive, from the user device, a geographic location associated with the user device; and
    sending, to the user device, a second notification indicating a plurality of merchants in the geographic location that do not enforce the one or more card-based transaction rules.

9. A server comprising:
one or more processors; and
memory storing instructions that, when executed by the one or more processors, cause the server to:
    receive, via an electronic payment network and from a plurality of users, transaction data associated with a plurality of merchants;
    determine a first average purchase amount associated with merchants in a merchant category;
    determine, based on the first average purchase amount, a second average purchase amount associated with each merchant in the merchant category;
    train, using first training data comprising a transaction amount and a transaction location associated with one or more merchants in the merchant category, a first machine learning model to determine transaction patterns of the one or more merchants in the merchant category;
    provide, as input to the first machine learning model, transaction data associated with a first merchant from the plurality of users;
    receive, as output from the first machine learning model, a spending pattern associated with the first merchant;
    provide, as input to a second machine learning model, the spending pattern and the second average purchase amount, wherein the second machine learning model is trained based on second training data comprising:
        prelabeled transaction data from training merchants having a similar size as the first merchant;
        prelabeled transaction data from training merchants located within a geographic location as the first merchant;
        prelabeled transaction data from training merchants in a same merchant category as the first merchant; and
        training labels indicating whether the training merchants enforce card enforce a card-based minimum purchase amount;
    determine, based on output from the second machine learning model, that the first merchant enforces one or more card-based transaction rules comprising a minimum purchase amount on card-based transactions;

determine that a user device associated with a first user of the plurality of users, has connected to a wireless network associated with to the first merchant for a predetermined period of time;

send, to the user device associated with the first user, a notification indicating that the first merchant enforces the one or more card-based transaction rules comprising the minimum purchase amount on card-based transactions; and cause the user device to display the first merchant on a user interface with a flag indicating that the first merchant enforces the one or more card-based transaction rules comprising the minimum purchase amount on card-based transactions receive, from the user interface on the user device, an indication for merchants that do not enforce the one or more card-based transaction rules comprising the minimum purchase amount on card-based transactions;

determine, based on the output of the second machine learning model, one or more merchants that do not enforce the one or more card-based transaction rules, wherein the second machine learning model is further trained based on prelabeled transaction data from training merchants that do not enforce the one or more card-based transaction rules; and cause, on the user interface, the user device to display the one or more merchants that do not enforce the one or more card-based transaction rules.

10. The server of claim 9, wherein the instructions, when executed by the one or more processors, cause the server to:
prior to determining the first average purchase amount, generate a histogram of payments associated with the merchant category based on the transaction data: and
filter out, based on an analysis of the histogram of payments, transaction data having purchase amounts above or below a predetermined threshold.

11. The server of claim 9, wherein the instructions, when executed by the one or more processors, cause the server to:
store, in a merchant database, the one or more card-based transaction rules associated with the first merchant.

12. The server of claim 9, wherein the one or more card-based transaction rules comprise at least one of:
a maximum purchase amount; or
a surcharge for card-based transactions.

13. The server of claim 9, wherein the instructions, when executed by the one or more processors, cause the server to:
receive, from the user device, a geographic location associated with the user device; and
compare the geographic location with a predefined geofence associated with the first merchant.

14. The server of claim 9, wherein the spending pattern associated with the first merchant comprises a plurality of transactions that each share a common payment amount.

15. The server of claim 9, wherein the instructions, when executed by the one or more processors, cause the server to:
receive, from the user device, a geographic location associated with the user device; and
send, to the user device, a second notification indicating a plurality of merchants in the geographic location that do not enforce the one or more card-based transaction rules.

16. One or more non-transitory media storing instructions that, when executed, cause a computing device to:
receive, via an electronic payment network and from a plurality of users, transaction data that is associated with a plurality of merchants;

determine a first average purchase amount associated with merchants in a merchant category;

determine, based on the first average purchase amount, a second average purchase amount associated with each merchant in the merchant category;

train, using first transaction training data comprising a transaction amount and a transaction location associated with one or more merchants in the merchant category, a first machine learning model to determine transaction patterns of the one or more merchants in the merchant category;

provide, as input to the first machine learning model, transaction data associated with a first merchant from the plurality of users;

receive, as output from the first machine learning model, a spending pattern associated with the first merchant;

provide, as input to a second machine learning model, the spending pattern and the second average purchase amount, wherein the second machine learning model is trained based on second training data comprising:
prelabeled transaction data from training merchants having a similar size as the first merchant;
prelabeled transaction data from training merchants located within a geographic location as the first merchant;
prelabeled transaction data from training merchants in a same merchant category as the first merchant; and
training labels indicating whether the training merchants enforce card enforce a card-based minimum purchase amount;

determine, based on output from the second machine learning model, that the first merchant enforces one or more transaction card-based rules comprising a minimum purchase amount on card-based transactions;

receive, from a user device, associated with a first user of the plurality of users, a geographic location associated with the user device;

compare the geographic location with a predefined geofence associated with the first merchant;

determine that the user device has connected to a wireless network associated with the first merchant for a predetermined period of time;

send, to the user device associated with the first user, a notification indicating the first merchant enforces the one or more transaction card-based rules;

cause the user device to display the first merchant on a user interface with a flag indicating that the first merchant enforces the one or more card-based transaction rules comprising the minimum purchase amount on card-based transactions;

receive, from the user interface on the user device, an indication for merchants that do not enforce the one or more card-based transaction rules comprising the minimum purchase amount on card-based transactions;

determine, based on the output of the second machine learning model, one or more merchants that do not enforce the one or more card-based transaction rules, wherein the second machine learning model is further trained based on prelabeled transaction data from training merchants that do not enforce the one or more card-based transaction rules; and cause, and on the user interface, the user device to display the one or more merchants that do not enforce the one or more card-based transaction rules.

17. The non-transitory media of claim 16, wherein the instructions, when executed, cause the computing device to:

generate a histogram of payments associated with the merchant category based on the transaction data:

filter out, based on an analysis of the histogram of payments, transaction data having purchase amounts above or below a predetermined threshold.

18. The non-transitory media of claim 16, wherein the instructions, when executed, cause the computing device to:

store, in a merchant database, the one or more card-based transaction rules associated with the first merchant.

19. The non-transitory media of claim 16, wherein the one or more card-based transaction rules comprise at least one of:

a maximum purchase amount; or a surcharge for card-based transactions.

* * * * *